US012763654B2

(12) United States Patent
Goichman et al.

(10) Patent No.: US 12,763,654 B2
(45) Date of Patent: Oct. 13, 2026

(54) MAGNETICALLY PRELOADED STAGE ASSEMBLY FOR ELECTRONIC COMPONENTS

(71) Applicant: Orbotech Ltd., Yavne (IL)

(72) Inventors: Tal Goichman, Kiryat Ono (IL); Ashkan Aghajani, Eliav (IL); Arkady Bronfman, Beer Sheva (IL)

(73) Assignee: Orbotech Ltd., Yavne (IL)

( * ) Notice: Subject to any disclaimer, the term of this patent is extended or adjusted under 35 U.S.C. 154(b) by 203 days.

(21) Appl. No.: 18/643,608

(22) Filed: Apr. 23, 2024

(65) Prior Publication Data

US 2025/0330077 A1 Oct. 23, 2025

(51) Int. Cl.

*H02K 41/02* (2006.01)
*F16C 32/04* (2006.01)
*H02K 7/09* (2006.01)
*H02K 11/01* (2016.01)

(52) U.S. Cl.

CPC ......... *H02K 41/02* (2013.01); *F16C 32/0472* (2013.01); *H02K 7/09* (2013.01); *H02K 11/014* (2020.08)

(58) Field of Classification Search

CPC ........ H02K 41/02; H02K 7/09; H02K 11/014; H02K 7/08; H02K 2201/03; H02K 2213/09; H02K 41/031; F16C 32/0472

See application file for complete search history.

(56) References Cited

U.S. PATENT DOCUMENTS 4,834,353 A 5/1989 Chitayat
7,126,666 B2 10/2006 De Weerdt et al.
7,554,226 B2 6/2009 Kojima et al.
8,084,896 B2 12/2011 Frankel (Continued)

FOREIGN PATENT DOCUMENTS

EP 0532927 A2 3/1993
JP 2001126651 A 5/2001

(Continued)

OTHER PUBLICATIONS

Ro, Seung-Kook, et al., "A linear air bearing stage with active magnetic preloads for ultraprecise straight motion"; Precision Engineering, vol. 34, Issue 1, Jan. 2010; pp. 186-194; https://www.sciencedirect.com/science/article/abs/pii/S0141635909000865?via%3Dihub.

(Continued)

*Primary Examiner* — Joseph Ortega

(74) *Attorney, Agent, or Firm* — DICKINSON WRIGHT PLLC

(57) ABSTRACT

A stage assembly for supporting and moving electronic components includes a guide rail. The stage assembly also includes a carrier for supporting an electronic component and moveable along a length of the guide rail. The stage assembly further includes a linear motor comprising a rotor and a stator assembly positioned along the length of the guide rail, the rotor operatively coupled to the carrier to actuate movement of the carrier along the length of the guide rail. The stage assembly yet further includes a flux shield formed of a ferromagnetic material and positioned between the stator assembly and the carrier. The stage assembly also includes one or more magnetic preload assemblies operatively coupled to the carrier.

19 Claims, 8 Drawing Sheets

(56) References Cited

U.S. PATENT DOCUMENTS

| | | | | |
|---|---|---|---|---|
| 9,041,266 | B2 | 5/2015 | Park et al. | |
| 9,079,279 | B2 | 7/2015 | Ro et al. | |
| 2003/0156270 | A1 | 8/2003 | Hunter | |
| 2011/0069291 | A1 | 3/2011 | Sogard | |
| 2020/0266692 | A1 * | 8/2020 | Trumper | H02K 1/34 |

FOREIGN PATENT DOCUMENTS

| | | | |
|---|---|---|---|
| KR | 100761690 | B1 | 9/2007 |
| TW | 201939566 | A | 10/2019 |

OTHER PUBLICATIONS

Lee, Hak-Jun, et al., "Development of Air Bearing Stage Using Flexure for Yaw Motion Compensation"; Actuators 2022, 11, 100; published Mar. 28, 2022; https://doi.org/10.3390/act11040100.

Ro, S.K., et al; "A magnetically preloaded air bearing stage with 5-DOF motion error compensation"; Proceedings of the 14th euspen International Conference—Dubrovnik—Jun. 2014; chrome-extension://efaidnbmnnnibpcajpcglclefindmkaj/https://www.euspen.eu/knowledge-base/ICE14-O5.2.pdf.

* cited by examiner

MAGNETICALLY PRELOADED STAGE ASSEMBLY FOR ELECTRONIC COMPONENTS

TECHNICAL FIELD

The disclosure generally relates to a support and transport assembly for electronic components and, more particularly, to a magnetically preloaded stage assembly for supporting and transporting electronic components.

BACKGROUND

Stage assemblies for supporting and moving electronic components may be utilized in electronic component manufacturing environments to move the electronic components during an inspection process and/or to modify the electronic component. The stage assemblies may be configured to move electronic components in 2-or 3-dimensional space to carry out the desired manufacturing process. Such stage assemblies may rely on a low vacuum force inside one or more air bearings to apply a preload between a moving part and a guide structure of the stage assembly, but this typically results in a low stiffness during movement of the moving part which may hinder certain aspects of the manufacturing process. Another type of stage assembly may use air bearings on opposing sides of the guide structure, but this requires a significant increase in volume and inertia of the moving part.

SUMMARY OF THE DISCLOSURE

According to one aspect of the disclosure, a stage assembly for supporting and moving electronic components includes a guide rail. The stage assembly also includes a carrier for supporting an electronic component and moveable along a length of the guide rail. The stage assembly further includes a linear motor comprising a rotor and a stator assembly positioned along the length of the guide rail, the rotor operatively coupled to the carrier to actuate movement of the carrier along the length of the guide rail. The stage assembly yet further includes a flux shield formed of a ferromagnetic material and positioned between the stator assembly and the carrier. The stage assembly also includes one or more magnetic preload assemblies operatively coupled to the carrier.

According to another aspect of the disclosure, a stage assembly for supporting and moving electronic components includes a guide rail. The stage assembly also includes a carrier for supporting an electronic component and moveable along a length of the guide rail. The stage assembly further includes a linear motor operatively coupled to one of the guide rail and the carrier, the linear motor actuating movement of the carrier along the length of the guide rail. The stage assembly yet further includes one or more air bearings coupled to one of the carrier and the guide rail, the air bearings configured to provide pressurized air between the carrier and the guide rail to create a distance between the carrier and the guide rail. The stage assembly also includes one or more adjustable magnetic preload assemblies operatively coupled to the carrier, the adjustable preload assemblies configured to selectively adjust a distance between the carrier and the guide rail.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The following description is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
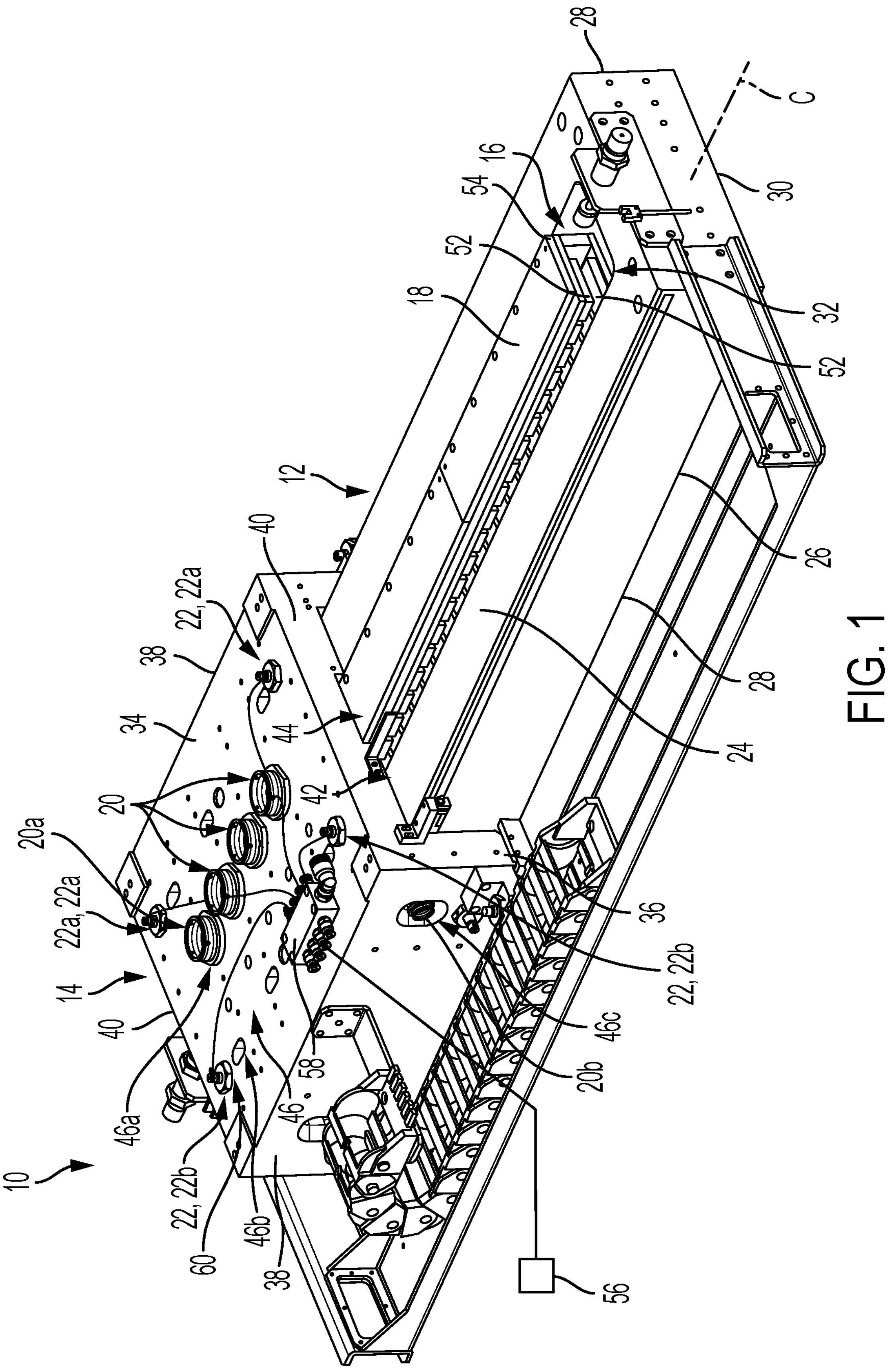
FIG. 1 is a perspective view of a stage assembly including a carrier which moves along a guide rail.

Referring initially to FIG. 1, a stage assembly 10 is depicted. The stage assembly 10 is configured to be used in the manufacture and inspection of electronic components. The electronic components may be any suitable wafer/substrate suitable substrates, panels for flat panel displays, solar panels, reticles or any other suitable object. Therefore, the term "electronic components", as used herein, refers generically to any of the aforementioned objects. The embodiments of the stage assembly 10 disclosed herein allow for increased stiffness of the overall assembly during movement of a carrier 14 which supports the electronic component.

Figure 2:
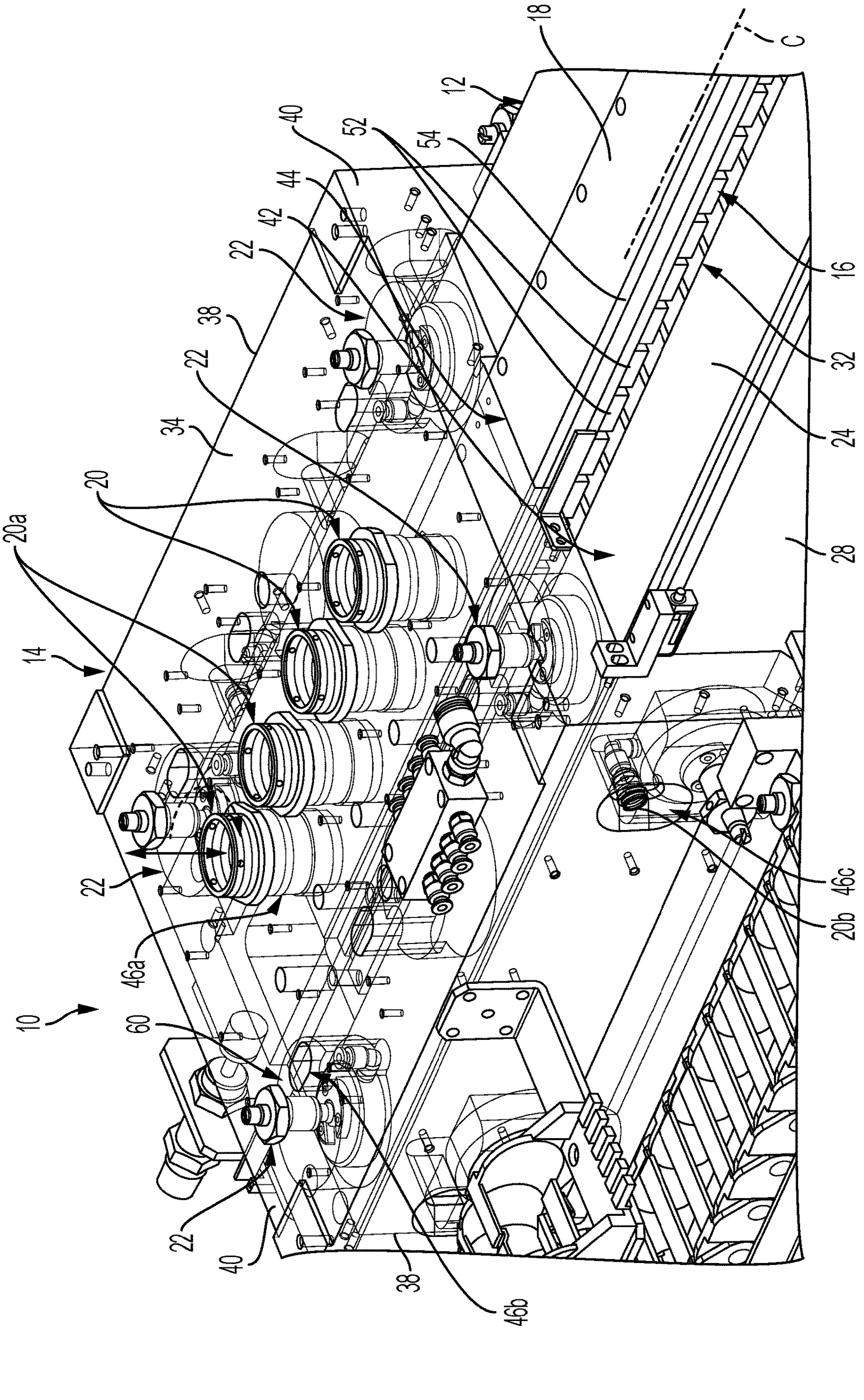
FIG. 2 is a perspective view of a portion of the stage assembly with the carrier shown transparently.

Referring now to FIGS. 1 and 2, the stage assembly 10 includes the guide rail 12, the carrier 14, a linear motor 16, a flux shield 18, one or more adjustable magnetic preload assemblies 20, and one or more air bearings 22. The guide rail 12 may have a rectangular cross-sectional shape that extends in a longitudinal direction. The guide rail 12 includes an upper surface 24, a lower surface 26, a pair of sides 28 extending between the upper surface 24 and the lower surface 26, and a pair of ends 30 between the pair of sides 28. The guide rail 12 defines a motor receiving cavity 32 recessed into the upper surface 24 away from the carrier 14. The motor receiving cavity 32 extends along at least a portion of the length of the guide rail 12. The motor receiving cavity 32 may be positioned along a geometric centerline C bisecting the guide rail 12 along the length of the guide rail 12. The geometric centerline C may extend along a longitudinal axis, where the carrier 14 moves along the guide rail 12 in the longitudinal direction.

The carrier 14 extends along a length, where the length of the carrier 14 is shorter than the length of the guide rail 12 to allow the carrier 14 to travel along the guide rail 12. While the carrier 14 and the guide rail 12 are depicted as having a rectangular cross-section, the carrier 14 and rail 12 may include any cross-sectional shape which are operable to permit the carrier 14 to travel along the guide rail 12. The carrier 14 may include an upper side 34, an underside 36, a pair of sides 38 extending between the upper side 34 and the underside 36, and a pair of ends 40 between the pair of sides 38. The carrier 14 defines a rail receiving cavity 42 extending into the underside 36 such that the guide rail 12 may be at least partially positioned in the rail receiving cavity 42. The rail receiving cavity 42 may be sized to permit the guide rail 12 to be positioned within the rail receiving cavity 42 while maintaining a space between the sides of the guide rail 12 and the walls which define the rail receiving cavity 42. The carrier 14 may further define a cutout 44 extending from the rail receiving cavity 42 toward the upper side 34 of the carrier 14, where the cutout 44 extends along the geometric centerline C of the guide rail 12 to be positioned opposite the motor receiving cavity 32. The carrier 14 may define a plurality of openings 46 extending through the upper side 34 and the sides to the rail receiving cavity 42. The plurality of openings 46 may include mounting openings 46*a* which allow for mounting of the magnetic preload assemblies 20 and the air bearings 22. The plurality of openings 46 may further include throughholes 46*b* for allowing airflow therethrough to the air bearings 22.

Figure 3:
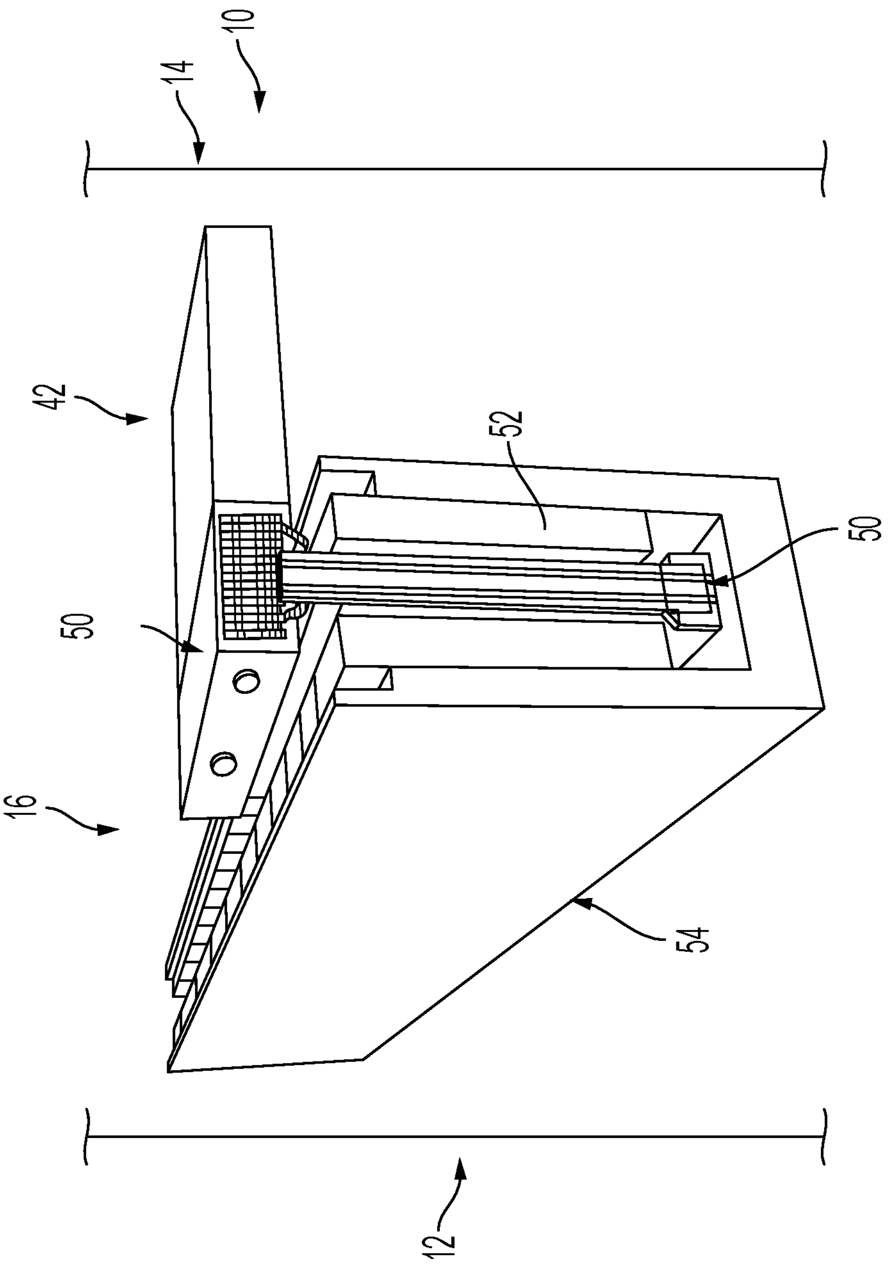
FIG. 3 is a perspective view of a linear motor coupled to the carrier of the stage assembly.
Figure 4:
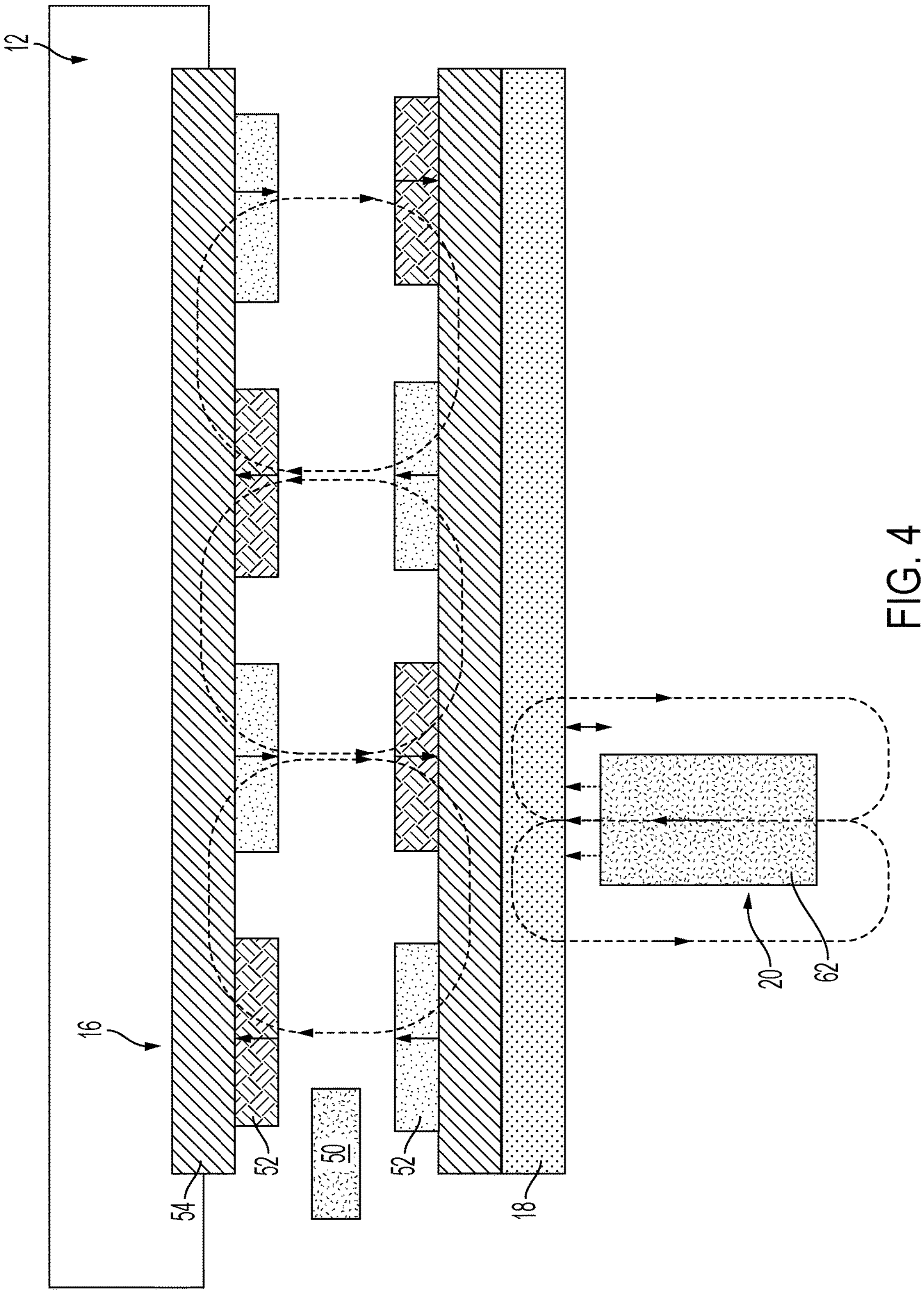
FIG. 4 schematically a magnetic preload assembly of the stage assembly.

Referring now to FIGS. 3 and 4, with continued reference to FIGS. 1 and 2, the linear motor 16 may include a rotor 50 and a plurality of stator assembly 52 positioned along the length of the guide rail 12, where the rotor 50 is coupled to the carrier 14 such that the linear motor 16 is configured to move the carrier 14 along the length of the guide rail 12. The linear motor 16 may further include a substantially U-shaped housing 54 with the stator assembly 52 arranged along a length of the U-shaped housing 54 in opposing stator pairs such that the rotor 50 coupled to the carrier 14 is positioned between the opposing pair of the stators 52. The U-shaped housing 54 and the stator assembly 52 may be at least partially positioned within the motor receiving cavity 32 to be positioned between the guide rail 12 and the carrier 14. In some embodiments, the stage assembly 10 may include a non-linear motor, such as a rotary motor, that similarly forces the carrier 14 to travel along the guide rail 12.

The flux shield 18 may be coupled to the U-shaped housing 54 of the linear motor 16 and is positioned between the linear motor 16 and the carrier 14. The flux shield 18 may extend into the cutout 44 in the carrier 14. However, in some embodiments, the flux shield 18 may be positioned within the rail receiving cavity 42 and spaced apart from the cutout 44 in the carrier 14. The flux shield 18 is formed of a ferrous material, such as steel, for example.

As disclosed herein, the embodiments disclosed herein provide a motion axis for the carrier 14 having a strong preload for enhanced stiffness by utilizing the ferromagnetic properties of the linear motor 16 and permanent magnets inside the stator assembly 52 which contribute to a magnetic preload force. The flux shield 18 smoothens uneven magnetic fields produced by individual magnets of the stator assembly 52 to prevent cogging, so that there is a constant attraction preload force between the moving carrier 14 and the guide rail 12. In some embodiments, diametral magnets in variable radial gap sleeves may be provided to adjust the constant preload force. This arrangement creates a constant preload force and avoids producing parasitic natural frequencies produced by standard magnets which act like springs. The constant preload force can be customized, as it is dependent on the gap utilized.

Referring now to FIGS. 1, 2, 5*a* and 5*b*, the plurality of air bearings 22 are positioned about the carrier 14 to be configured to provide pressurized air between the carrier 14 and the guide rail 12 to create a distance between the carrier 14 and the guide rail 12. The stage assembly 10 includes an air supply 56 and a valve unit 58 that is pneumatically connected to each of the air bearings 22 to provide the pressurized air through the air bearings 22. The air bearings 22 may be any traditional air bearing structure which allows for creating a space between the carrier 14 and the guide rail 12. The carrier 14 may define a plurality of recesses 60 sized to allow the air bearings 22 to be positioned therein and such that the air bearings 22 do not extend into the rail receiving cavity 42. The air bearings 22 may include a first pair of air bearings 22*a* at least partially aligned along the length of the guide rail 12, and a second pair of air bearings 22*b* at least partially aligned along the length of the guide rail 12, where the first pair of air bearings 22*a* and the second pair of air bearings 22*b* are positioned on opposite sides of the one or more adjustable magnetic preload assemblies 20. As will be described in greater detail below, the adjustable magnetic preload assemblies 20 may be aligned along the geometric centerline C such that the first pair of air bearings 22*a* and the second pair of air bearings 22*b* are positioned equidistant from and on opposing side of the geometric centerline C of the guide rail 12. The adjustable magnetic preload assemblies 20 may be positioned between the air bearings 22 of the first pair of air bearings 22*a*, and positioned between the air bearings 22 of the second pair of air bearings 22*b* such that the first pair of air bearings 22*a* and the second pair of air bearings 22*b* surround the preload assemblies 20.

Figure 5A:
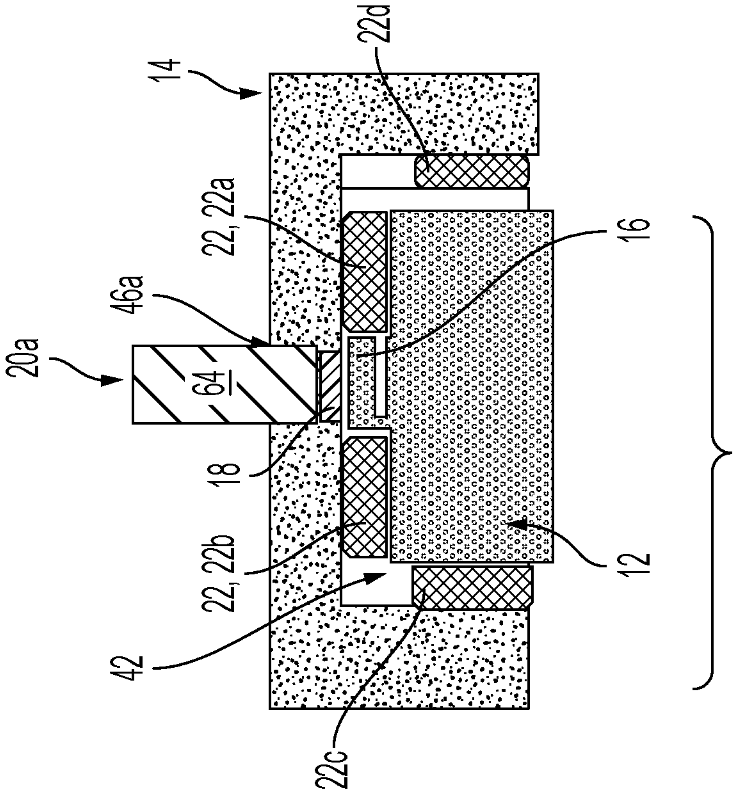
FIG. 5*a* is a cross-sectional view of the stage assembly with a first arrangement of a magnetic preload assembly.
Figure 5B:
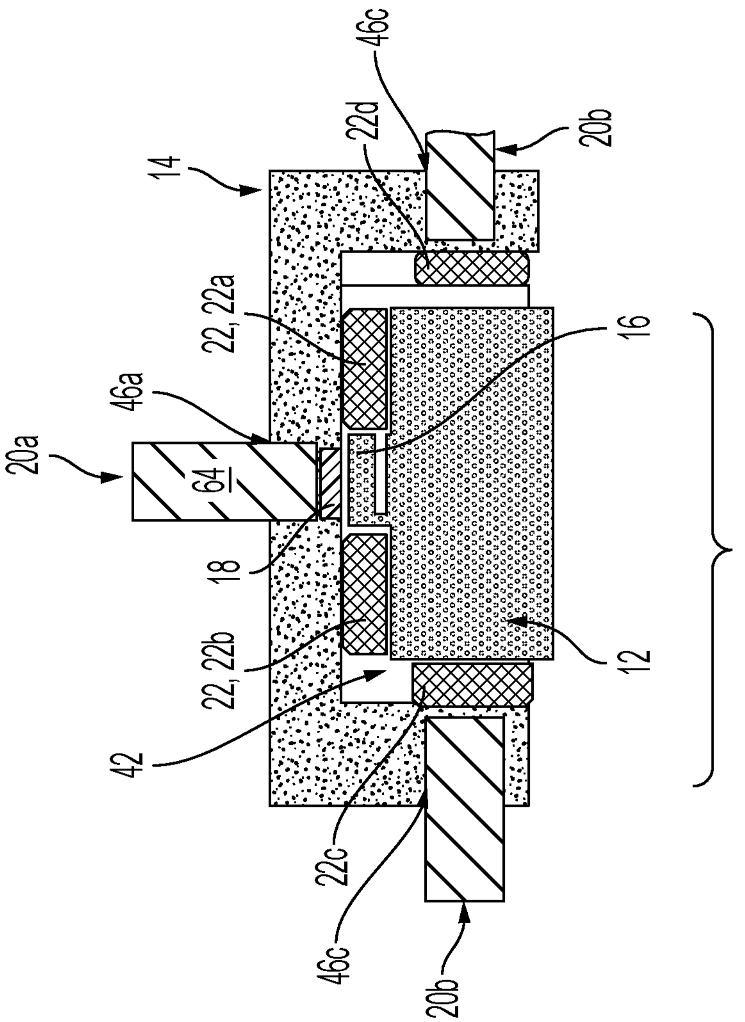
FIG. 5*b* is a cross-sectional view of the stage assembly with the first arrangement of the magnetic preload assembly and a second arrangement of the magnetic preload assembly.
Figure 6:
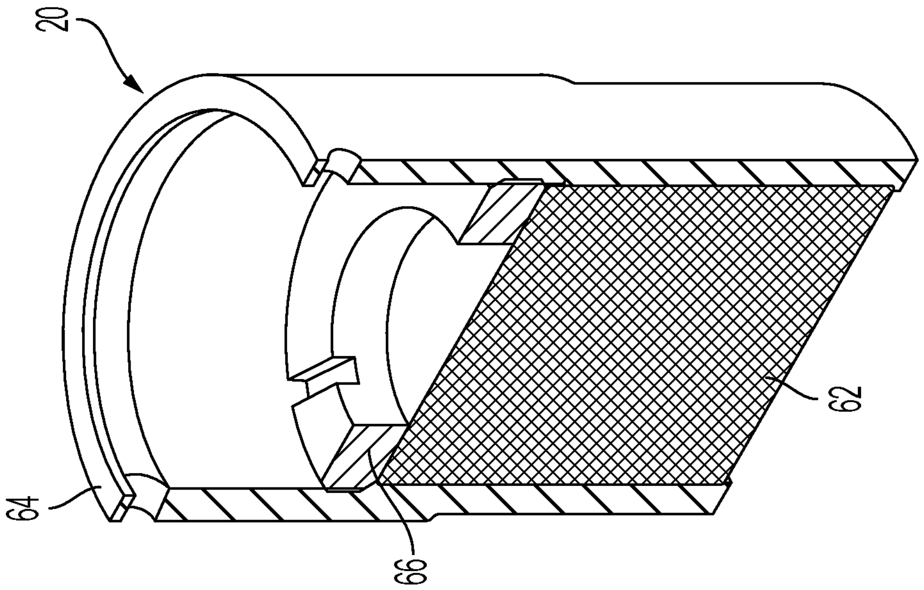
FIG. 6 is a perspective, cross-sectional view of a magnetic preload assembly of the stage assembly.

As shown in FIGS. 2, 5*a* and 5*b*, the plurality of air bearings 22 may include a third pair of air bearings 22*c* that are positioned within the carrier 14 to extend through one of the sides of the carrier 14 to direct pressurized air to the rail receiving cavity 42. The plurality of air bearings 22 may further include a fourth pair of air bearings 22*d* positioned on the other side of the carrier 14 from the third pair of air bearings 22*c*. The air bearings 22 that extend through the sides of the carrier 14 direct pressurized air at the sides of the guide rail 12 to create a space in a lateral direction between the carrier 14 and the guide rail 12, where the lateral direction is transverse to the longitudinal direction. The air bearings 22 that extend through the upper side 34 of the carrier 14 create a space in a vertical direction transverse to both the lateral direction and the longitudinal direction. It is to be understood that the precise number of air bearings and the location of such air bearings may vary depending upon the particular application of use. Therefore, the preceding description of the air bearings is merely an example and is not intended to be limiting.

FIGS. 1, 2, 5*a* and 5*b* illustrate two distinct arrangements of the magnetic preload assemblies 20. In particular, FIG. 5*a* depicts one of a first plurality of magnetic preload assemblies 20*a*. The first plurality of magnetic preload assemblies 20*a* extends through the upper side 34 of the carrier 14 toward the upper side 24 of the guide rail 12 and at least partially reside within mounting openings 46*a*. The first plurality of magnetic preload assemblies 20*a* apply a substantially vertical preload. FIG. 5*b* depicts a pair of a second plurality of magnetic preload assemblies 20*b* in combination with the first magnetic preload assemblies 20*a*. The second plurality of magnetic preload assemblies 20*b* extends through the sides 38 of the carrier 14 toward the sides 28 of the guide rail 12 and at least partially reside within mounting openings 46*c*. The second plurality of magnetic preload assemblies 20*b* apply a lateral preload. It is to be appreciated that embodiments with the side oriented magnetic preload assemblies 20*b* may include assemblies 20*b* within one or both sides 38 of the carrier 14.

Referring now to FIGS. 1, 2, 5*a*, 5*b* and 6, the adjustable magnetic preload assemblies 20 may be operatively coupled to the carrier 14 to provide a magnetic preload. The adjustable preload assemblies 20 may each include a magnet 62, a housing 64, and a magnet lock 66. The housing 64 and the magnet lock 66 may be coupled to the magnet 62 to be configured to adjust a distance between the magnet 62 and the flux shield 18. The distance between the magnet 62 and the flux shield 18 determines the magnetic preload applied to control the stiffness of the assembly.

Adjustment of the magnetic preload assemblies 20 may be performed in any suitable manner. For example, the positon of the housing 64 may be adjusted relative to the carrier 14 and/or the position of the magnet 62 may be adjusted relative to the housing 64. In one embodiment, adjustment of the housing 64 and/or the magnet 62 is achieved by corresponding threading of components. In particular, the housing 64 may be coupled to the carrier 14, and the magnet lock 66 may be positioned within the housing 64 to engage threads of the housing 64. The magnet 62 may be coupled to the magnet lock 66 and positioned within the housing 64 such that rotation of the magnet lock 66 changes a distance between the magnet 62 and the flux shield 18, where a decrease in the distance between the magnet 62 and the flux shield 18 increases the magnetic preload on the carrier 14. In the alternative, an increase in the distance between the magnet 62 and the flux shield 18 decreases the preload on the carrier 14.

The one or more adjustable magnetic preload assemblies 20 may include a plurality of preload assemblies 20 placed about the carrier 14 to allow for the preload to be adjusted in a plurality of locations, where an operator can adjust the preload in different locations to balance the carrier 14 on the guide rail 12 in a desired manner. For example, the one or more adjustable magnetic preload assemblies 20 may include a plurality of adjustable magnetic preload assemblies 20 that are aligned along the length of the guide rail 12 in the longitudinal direction. The plurality of adjustable magnetic preload assemblies 20 may be positioned along the geometric centerline C of the guide rail 12 directly above the flux shield 18. The plurality of adjustable magnetic preload assemblies 20 may be positioned on the upper side 34 and the sides of the carrier 14 to direct a magnetic force through the air bearings 22 when viewed along the longitudinal axis (see FIGS. 5*a* and 5*b*). In such embodiments, the housing 64 of the one or more adjustable magnetic preload assemblies 20 may be coupled to the side of the carrier 14 to direct a magnetic force at the rail receiving cavity 42 through one of the air bearings 22. The housings 64 of the one or more adjustable magnetic preload assemblies 20 may at least partially extend into the cutout 44 and the rail receiving cavity 42.

Figure 7:
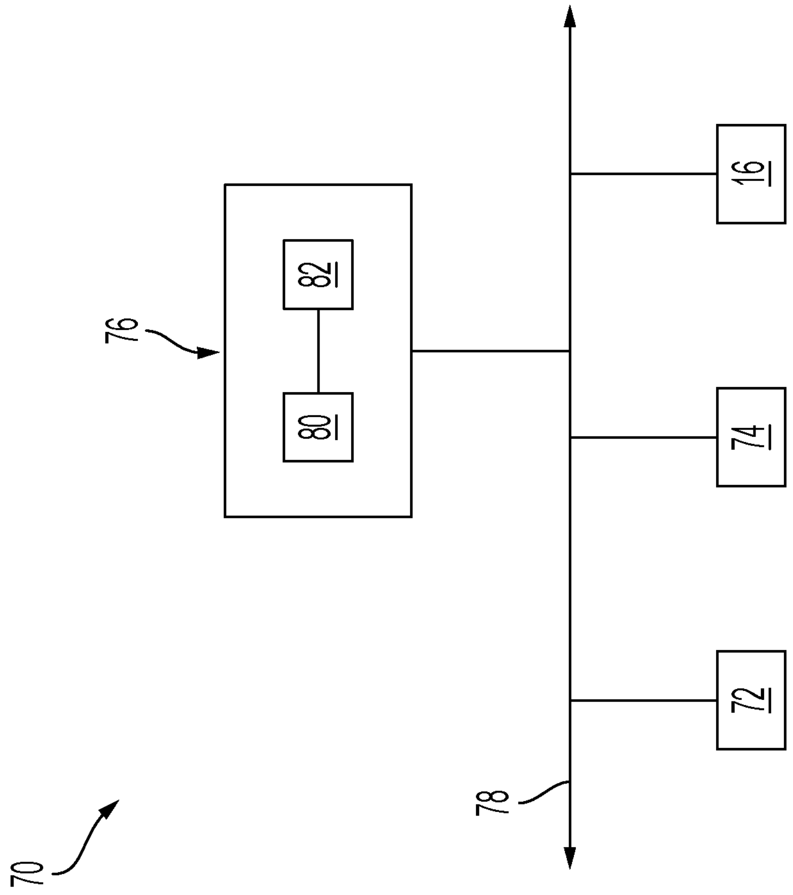
FIG. 7 schematically depicts a control system for the stage assembly.

Referring to FIG. 7, the stage assembly 10 may further include a control system 70 for controlling the operation of the stage assembly 10. For example, the control system 70 may include an encoder 72, a sensor 74, and controller 76. The encoder 72 may be coupled to the guide rail 12 and extend along a path of travel of the carrier 14 on the guide rail 12. The encoder 72 may extend between the two ends of the guide rail 12. The sensor 74 may be coupled to the carrier 14 at a location to be configured to detect the encoder 72 and communicate the detected location of the carrier 14 to the controller 76.

A communication path 78 may communicatively couple the controller 76 to the encoder 72, the sensor 74, and the linear motor 16 to send and receive signals thereto. The controller 76 includes a processor 80 and a non-transitory electronic memory 82 to which various components are communicatively coupled. In some embodiments, the processor 80 and the non-transitory electronic memory 82 and/or the other components are included within a single device. In other embodiments, the processor 80 and the non-transitory electronic memory 82 and/or the other components may be distributed among multiple devices that are communicatively coupled. The controller 76 includes non-transitory electronic memory 82 that stores a set of machine-readable instructions. The processor 80 executes the machine-readable instructions stored in the non-transitory electronic memory 82. The machine-readable instructions may include software that controls operation of the processor 80 to perform the operations described herein to be performed by the controller 76. The non-transitory electronic memory 82 may include volatile memory 82 and non-volatile memory 82 for storing instructions and data. The non-volatile memory 82 may include solid-state memories, such as NAND flash memory 82, magnetic and optical storage media, or any other suitable data storage device that retains data when the processor 80 is deactivated or loses electrical power. Non-volatile storage may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The volatile memory 82 may include static and/or dynamic random-access memory (RAM), flash memory, cache memory, or other memory capable of storing program instructions and data. In short, the non-transitory electronic memory 82 may include RAM, ROM, flash memories, hard drives, or any device capable of storing machine-readable instructions such that the machine-readable instructions can be accessed by the processor 80. Accordingly, the control system described herein may be implemented in any conventional computer programming language, as pre-programmed hardware elements, or as a combination of hardware and software components. The non-transitory electronic memory 82 may be implemented as one memory module or a plurality of memory modules.

The processor 80 may be any device capable of executing machine-readable instructions. For example, the processor 80 may be may be or include an integrated circuit, a microchip, a computer, a microprocessor, a micro-controller, a digital signal processor, a microcomputers, a central processing unit, field programmable gate arrays, programmable logic devices, state machines, logic circuits, analog circuits, digital circuits, or any other devices that manipulate signals (analog or digital) based on computer-executable instructions residing in memory 82. The non-transitory electronic memory 82 and the processor 80 are coupled to the communication path 78 that provides signal interconnectivity between various components and/or modules of the actuation system. Accordingly, the communication path 78 may communicatively couple any number of processor 80*s* with one another, and allow the modules coupled to the communication path 78 to operate in a distributed computing environment. Specifically, each of the modules may operate as a node that may send and/or receive data. As such, the controller 76 may include an input/output (I/O) interface configured to provide digital and/or analog inputs and outputs. The I/O interface can be used to transfer information between internal storage and external input and/or output devices (e.g., display). The I/O interface can include associated circuitry or BUS networks to transfer such information. Such a BUS or associated circuitry can allow the components to be communicatively coupled. As used herein, the term "communicatively coupled" means that coupled components are capable of exchanging data signals with one another such as, for example, electrical signals via conductive medium, electromagnetic signals via air, optical signals via optical waveguides, and the like.

The controller 76 may be configured to control the position of the carrier 14 relative to the guide rail 12 based on, for example, instructions stored in the memory 82. The instructions may include a present path for the carrier 14 to allow for manufacturing or inspection of a workpiece carried by the carrier 14. The controller 76 may detect an initial location of the carrier 14 before actuating the linear motor 16 to move the carrier 14 to a first predetermined location. The controller 76 may wait a predetermined amount of time or wait for an external signal instructing the controller 76 to move the carrier 14 to a second predetermined location. When moving the carrier 14, the controller 76 may receive signals from the encoder 72 and sensor 74 to determine the position of the carrier 14 relative to the predetermined locations and adjust the position of the carrier 14 accordingly.

The disclosed stage assembly 10 allows for a precise and accurate movement of the carrier 14 due to a near-frictionless movement of the carrier 14 relative to the guide rail 12. Specifically, the carrier 14 does not contact the guide rail 12 physically to limit friction on the movement of the carrier 14 to friction from the air. The preload assemblies 20 allow for adjustment of the position of the carrier 14 relative to the guide rail 12 in the lateral and vertical directions, further increasing the accuracy of the movement of the carrier 14.

It is contemplated and possible that the various components attached to the carrier 14 and the guide rail 12 may be interchanged by coupling to the other of the carrier 14 and the guide rail 12. For example and without limitation, the air bearings 22 may be coupled to the guide rail 12. For further example, the preload assemblies 20 may be coupled to the guide rail 12 with the flux shield 18 coupled to the carrier 14. It is further contemplated and possible that the stage assembly 10 may be used in combination with other stage assemblies to move a workpiece in the lateral direction and the vertical direction. Such other stage assemblies may include using two or more of the disclosed stage assembly 10, or alternative stage assemblies in addition to the disclosed stage assembly 10.

The embodiments disclosed herein advantageously provide a continuously adjustable magnet preload for air bearings, thereby allowing compact and high rigidity (i.e., stiffness) motion stage axis. Positioning the ferromagnetic flux shield 18 plate over individual stator magnets smoothens the motion to prevent cogging. The embodiments avoid the need for a magnet circle wrapping arrangement, thereby saving space for efficient packaging.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While the disclosure has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A stage assembly for supporting and moving at least one electronic component comprising:
- a guide rail;
- a carrier for supporting the at least one electronic component and moveable along a length of the guide rail;
- a linear motor comprising a rotor and a stator assembly positioned along the length of the guide rail, the rotor operatively coupled to the carrier to actuate movement of the carrier along the length of the guide rail;
- a flux shield formed of a ferromagnetic material and positioned between the stator assembly and the carrier; and
- one or more magnetic preload assemblies operatively coupled to the carrier;
- wherein the one or more magnetic preload assemblies are each adjustable to modify a magnetic preload on the carrier relative to the guide rail.

2. The stage assembly of claim 1, wherein the one or more magnetic preload assemblies comprise a plurality of magnetic preload assemblies aligned along the length of the guide rail.

3. The stage assembly of claim 1, wherein the one or more magnetic preload assemblies each comprise a housing and a magnet disposed within the housing, wherein the housing is threaded to the carrier, wherein rotation of the housing changes a distance between the magnet and the flux shield.

4. The stage assembly of claim 1, wherein the one or more magnetic preload assemblies each comprise a housing and a magnet disposed within the housing, wherein the magnet is threaded to the housing, wherein rotation of the magnet changes a distance between the magnet and the flux shield.

5. The stage assembly of claim 1, wherein the guide rail defines a motor receiving cavity that is recessed away from the carrier, the linear motor at least partially positioned within the motor receiving cavity to be positioned between the guide rail and the carrier.

6. The stage assembly of claim 1, wherein the carrier comprises an underside that defines a guide rail receiving cavity that the guide rail is at least partially positioned in, and the one or more magnetic preload assemblies are coupled to a side of the carrier to direct a magnetic force at the rail receiving cavity.

7. The stage assembly of claim 1, further comprising one or more air bearings coupled to one of the carrier and the guide rail, and the air bearings are configured to provide pressurized air between the carrier and the guide rail.

8. The stage assembly of claim 7, wherein the one or more air bearings comprise a first pair of air bearings that are at least partially aligned along the length of the guide rail, and a second pair of air bearings that are at least partially aligned along the length of the guide rail, the first pair of air bearings and the second pair of air bearings are positioned on opposite sides of the one or more adjustable magnetic preload assemblies.

9. The stage assembly of claim 1, wherein the at least one electronic component is one of a wafer, a substrate, a panel, a solar panel, and a reticle.

10. A stage assembly for supporting and moving at least one electronic component comprising:

a guide rail;

a carrier for supporting the at least one electronic component and moveable along a length of the guide rail;

a linear motor operatively coupled to one of the guide rail and the carrier, the linear motor actuating movement of the carrier along the length of the guide rail;

one or more air bearings coupled to one of the carrier and the guide rail, the air bearings configured to provide pressurized air between the carrier and the guide rail to create a distance between the carrier and the guide rail; and one or more adjustable magnetic preload assemblies operatively coupled to the carrier, the adjustable preload assemblies configured to selectively adjust a distance between the carrier and the guide rail.

11. The stage assembly of claim 10, wherein the carrier comprises an underside that defines a rail receiving cavity, the guide rail is at least partially positioned within the rail receiving cavity, and the one or more air bearings are configured to provide pressurized air into the rail receiving cavity.

12. The stage assembly of claim 11, wherein the one or more adjustable magnetic preload assemblies are coupled to a side of the carrier to direct a magnetic force at the rail receiving cavity.

13. The stage assembly of claim 11, further comprising a flux shield coupled to the guide rail to be positioned within the rail receiving cavity.

14. The stage assembly of claim 13, wherein the one or more adjustable magnetic preload assemblies at least partially extend into the rail receiving cavity.

15. The stage assembly of claim 10, wherein the one or more adjustable magnetic preload assemblies comprise a plurality of adjustable magnetic preload assemblies that are aligned along the length of the guide rail.

16. The stage assembly of claim 10, wherein the one or more adjustable magnetic preload assemblies each further comprise a housing, and a magnet lock, the housing is internally threaded and coupled to the carrier, the magnet lock is positioned within the housing to engage the threads of the housing, and the magnet is coupled to the magnet lock and positioned within the housing such that rotation of the magnet lock changes a distance between the magnet and the flux shield.

17. The stage assembly of claim 10, wherein the one or more air bearings comprise a first pair of air bearings that are at least partially aligned along the length of the guide rail, and a second pair of air bearings that are at least partially aligned along the length of the guide rail, the first pair of air bearings and the second pair of air bearings are positioned on opposite sides of the one or more adjustable magnetic preload assemblies.

18. The stage assembly of claim 10, wherein the at least one electronic component is one of a wafer, a substrate, a panel, a solar panel, and a reticle.

19. A stage assembly for supporting and moving at least one electronic component comprising:

a guide rail;

a carrier for supporting the at least one electronic component and moveable along a length of the guide rail;

a linear motor comprising a rotor and a stator assembly positioned along the length of the guide rail, the rotor operatively coupled to the carrier to actuate movement of the carrier along the length of the guide rail;

a flux shield formed of a ferromagnetic material and positioned between the stator assembly and the carrier; and a plurality of magnetic preload assemblies operatively coupled to the carrier;

wherein the plurality of magnetic preload assemblies are positioned above the flux shield and aligned along a centerline of the guide rail in a longitudinal direction.

* * * * *